3,471,579
ADDITION OF POLYHALOGENATED COMPOUNDS TO OLEFINIC COMPOUNDS
Donald H. Kubicek, Bartlesville, Okla., assignor to Phillips Petroleum Company, a corporation of Delaware
No Drawing. Filed Jan. 20, 1967, Ser. No. 610,486
Int. Cl. C07c *17/00, 21/00*
U.S. Cl. 260—633                                    7 Claims

ABSTRACT OF THE DISCLOSURE

A process of forming a polyhalogenated compound by reacting certain olefins with a halogenated methane in the presence of a transition metal carbonyl and a coordinating compound.

---

This invention relates to the addition of polyhalogenated compounds to olefinic compounds. In another aspect, this invention relates to a method of producing polyhalogenated hydrocarbons.

It is well known in the art that polyhalogenated compounds are useful as intermediates in the synthesis of other compounds, in the preparation of addition polymers, as plasticizers, and as modifiers. For example, a polyhalogenated alcohol, such as 2,4,4,4-tetrachlorobutanol, can be dehydrohalogenated by strong bases to yield the corresponding epoxide, 1,1,1-trichloro-3,4-butylene oxide, which forms an adhesive upon reaction with amines. It is also known that the presence of halogen atoms imparts fire resistance to polymers. Thus, pendant halogenated methyl groups in the above-mentioned epoxide will impart fire resistance to polymeric compositions into which the epoxide is incorporated.

Therefore, one object of this invention is to provide a novel process for producing polyhalogenated hydrocarbons. Another object of this invention is to provide a novel process for the catalytic addition of polyhalogenated compounds to olefinic compounds.

According to the invention, polyhalogenated compounds having at least one

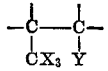

radical wherein X is any halogen and Y is selected from hydrogen, chlorine, bromine, or iodine, are produced by contacting, under reaction conditions an olefinic compound having not more than 30 carbon atoms per molecule, and having the general formula

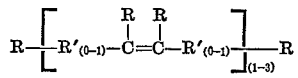

wherein each R is selected from hydrogen, or alkyl, alkoxy (R—O—), alkoxycarbonyl (R—OOC—), alkanoyl (R—CO—), alkanoyloxy (R—COO—), or cycloalkyl radicals having from 1 to 20 carbon atoms, or hydroxy-, carboxy-, oxo-, or halogen-substituted alkyl or cycloalkyl radicals having from 1 to 20 carbon atoms; each R' is an alkylene radical having from 1 to 10 carbon atoms or a hydroxy-, oxo-, or halogen-substituted alkylene radical having from 1 to 10 carbon atoms; and in which multiple double bonds, if present, are in nonconjugated positions; with a halogenated methane having the formula $CX_3Y$ wherein X and Y are as previously defined, in the presence of a catalyst formed from the admixture of a transition metal carbonyl generally having the formula $M(CO)_z$ wherein M is a transition metal of Groups VI–B, VII–B, or VIII as illustrated in the periodic table on page B–2 of Handbook of Chemistry and Physics, Chemical Rubber Co., 45th edition (1964), and z is a coordination number of M, which normally is a number ranging from 2–6 which covers all possible combinations of carbonyl with the said transition metal including dimeric or other polynuclear forms of such a metal carbonyl which may exist; and a coordinating compound selected from $R''_3P$, $R''_3As$, $R''_3Sb$, $R''_3N$, $R''_2NH$, $R''NH_2$, $(R''O)_3P$, $(R''O)_3As$, and $(R''O)_3Sb$ wherein each R'' is a hydrocarbon radical selected from alkyl, aryl, cycloalkyl or combinations thereof, such as alkaryl and aralkyl, each R'' having from 1 to 20 carbon atoms.

Some examples of suitable olefinic reactants are: ethylene, propylene, 2,3-dimethyl-1-butene, hexene-3,1, 4,7-octatriene, allyl alcohol, methallyl chloride, ethyl allyl ether, propenal, 4-pentene-2-one, crotyl alcohol, 7,7-dipentyl-4-eicosene-1-ol, mixtures and combinations thereof, and the like.

Some examples of suitable halogenated methane compounds are: carbon tetrachloride, carbon tetraiodide, carbon tetrabromide, chloroform, iodoform, fluoroform, bromotrichloromethane, chlorotrifluoromethane, mixtures thereof, and the like.

Some examples of suitable transition metal carbonyl compounds for use as the first component of the catalyst are $Cr(CO)_6$, $Mo(CO)_6$, $W(CO)_6$, $[Mn(CO)_5]_2$, $[Re(CO)_5]_2$, $Fe(CO)_5$, $Fe_2(CO)_9$, $Ru(CO)_5$, $Os(CO)_5$, $[Co(CO)_4]_2$, $[Co(CO)_3]_4$, $[Rh(CO)_4]_2$, $[Ir(CO)_4]_2$, $Ni(CO_4)_4$, mixtures thereof, and the like.

Some examples of suitable coordinating compounds which can be used as the second catalyst component are: tributylphosphine, tribenzylarsine, tri-p-tolylstibene, tricyclohexyl phosphite, tri(2-ethylhexyl) arsenite, triethylamine, propylbutylamine, cyclopentylamine, triphenylphosphine, trieicosylphosphine, mixtures thereof, and the like.

The catalyst is preferably formed separately from the addition reaction, but it can also be formed in situ in the presence of the olefinic compound and halogenated methane reagents under reaction conditions. Various proportions of the catalyst components can be used but it is preferred to admix from 0.1 to 4 molecular weight equivalents of the coordinating compound with each atomic weight equivalent of transition metal in the transition metal carbonyl compound. It must be noted, however, that proportions above and below this range can sometimes be used. A molecular weight equivalent of the coordinating compound is merely a mole of the coordinating compound while an atomic weight equivalent of the transition metal carbonyl compound is that fraction of a mole corresponding to the number of transition metal atoms in the molecule. Thus, for example, an atomic weight equivalent of Fe and Co in $Fe_2(CO)_9$ and $[Co(CO)_3]_4$ is ½ and ¼ of the mole weight respectively. This definition is necessary because these transition metal carbonyl compounds many times exist in the polymeric or polynuclear form. When preparing the catalyst separately, suitable amounts of transition metal carbonyl compound and coordinating compound are admixed either in the presence or absence of an inert diluent in which these materials are at least partially soluble, such as methylene chloride, cyclohexane, dioxane, or the halogenated methane reagent itself, at a temperature and for a time sufficient to permit the catalyst to be formed. The catalytic components are normally admixed at 50 to 130° C., and depending upon the specific components used, for a time in the range of a few seconds up to several hours. If the catalyst is prepared in situ, the catalytic components are simply delivered to the reaction zone either before, during, or after the reaction components, and the reaction is conducted in a manner as will be described below.

In carrying out the process, the olefinic compound and the halogenated methane compound are contacted in the presence of the above-described catalytic agent either batchwise or continuously. The reaction is preferably carried out within the temperature range from 50 to 110° C. Temperatures both above and below this range can be used; however, lower temperatures tend to reduce the reaction rate and the higher temperatures tend to produce some polymeric by-products. The contact time can vary from about 0.5 to 100 hours depending upon the reagents, the reaction conditions, and the desired degree of conversion. If desired, the reaction can be carried out in an inert diluent in which the reactants and the catalyst components are at least partially soluble. Some suitable diluents are: pentane, cyclohexane, methylene chloride, chlorobenzene, dioxane, mixtures thereof, and the like. Any convenient pressure sufficient to maintain the reactants and diluent substantially completely in the liquid phase within the reaction zone can be used. The preferred mode of operation is to carry out the reaction in a vessel equipped with a column and condenser under a pressure sufficient to permit a refluxing of the reaction mixture at the desired reaction temperature.

The proportion of halogenated methane compound to olefinic compound can vary widely from about 0.1 to 5 molecular weight equivalents of the halogenated methane for each molecular weight equivalent of the olefinic compound, and preferably from about 0.5 to 1.5 molecular weight equivalents of the halogenated methane compound for each molecular weight equivalent of the olefinic compound. The higher ratios can be used with olefinic compounds having more than one double bond per molecule if it is desired to involve more than one double bond in the reaction.

The proportion of catalytic agent to reactants in the reaction will vary widely but will normally be such that 0.0001 to 1, and preferably from 0.001 to 0.1 atomic weight equivalents of transition metal in the transition metal compound as defined above will be present for each molecular weight equivalent of olefinic compound.

The reaction is preferably carried out in an inert atmosphere and inert gases, such as nitrogen and helium, can be used for this purpose.

Some examples of polyhalogenated compounds which can be prepared by the process of this invention are: 1,1,1,3-tetrachloropropane, 1,1-dichloro-1,3 - dibromobutane, 1,1-difluoro-1,3 - dibromo - 2,2,3 - trimethylbutane, 3-(trichloromethyl) hexane, 1,1,1,10,10,10-hexachloro-2,9-dimethyl-5-trichloromethyldecane, 2,4,4,4 - tetrachlorobutanol, 1,1,1,4-tetrachloro-3-iodo-3-methylbutane, ethyl 2,4,4,4-tetrachlorobutyl ether, 2-iodo-4,4,4-tribromobutanol, 4,6,6,6-tetrabromo-2-hexanone, 2,4,4,4-tetraiodo-3-cyclopentylbutanol, 4,4,4-trifluorobutyl butyrate, 5-(trichloromethyl)-7,7-dipentyleicosanol, mixtures thereof, and the like.

The following examples will serve to illustrate the invention more clearly.

EXAMPLE I

About 0.26 mole of carbon tetrachloride, 0.0037 mole of iron pentacarbonyl, and 0.0012 mole of tributylphosphine were added to a reactor equipped with a reflux condenser and a nitrogen inlet. This solution was heated under reflux conditions and under a slow stream of nitrogen gas for 1 hour and then about 0.37 mole of allyl alcohol was added. The temperature of the refluxing reaction mixture rose from 75 to 110° C. over a period of 8 hours, at which time the reaction was stopped. Gas-liquid chromatographic analysis of the reaction mixture showed several products with one product being present in better than 90 weight percent of the total products. Distillation of this mixture under reduced pressure resulted in a nearly quantitative recovery of a clear liquid, indicating very little formation of high-boiling polymeric materials. Analysis showed that the major product was 2,4,4,4-tetrachlorobutanol.

EXAMPLE II

The same reactor of Example I was used in this example and was charged with 0.31 mole of carbon tetrachloride, 0.0022 mole of iron pentacarbonyl, and 0.0015 mole of triphenylphosphite. This mixture was heated under reflux for 30 minutes and then 0.29 mole of allyl alcohol was added and the reflux was continued for 38 hours. Distillation of the reaction mixture yielded a major product which was shown by analysis to be 2,4,4,4-tetrachlorobutanol.

EXAMPLE III

This example is presented to show catalyst productivity. A reactor equipped with a reflux condenser and a nitrogen gas inlet was charged with 2 moles of carbon tetrachloride, 0.0037 mole of iron pentacarbonyl, and 0.002 mole of tributylphosphine. This mixture was refluxed for 1 hour. To this mixture was added 1.47 moles of allyl alcohol. The reaction mixture was heated and maintained under refluxing conditions. The reflux temperature was about 74° C. The solution remained a light yellow for several hours and then began to darken. Gas-liquid chromatographic analysis of samples taken at 28 and 48 hours showed that 2,4,4,4-tetrachlorobutanol was being formed. The reaction was stopped after 70 hours. The reaction mixture was distilled to give:

| | Parts by weight |
|---|---|
| Mixture of allyl alcohol and carbon tetrachloride | 328 |
| 2,4,4,4-tetrachlorobutanol | 60 |
| Higher-boiling material | 13 |
| Sum of total recovered materials | 401 |

The total amount of materials charged was 393 parts by weight. The catalyst productivity of the run was 82 to 1 based on the weight of the tetrachlorobutanol obtained and the weight of iron carbonyl charged.

EXAMPLE IV

This run was conducted at higher catalyst level and a shorter reaction time. To the reactor of Example III were charged 2 moles of carbon tetrachloride, 0.015 mole of iron pentacarbonyl, and 0.008 mole of tributylphosphine. This mixture was heated under reflux for 30 minutes and then 1.47 moles of allyl alcohol were added. The reaction was continued for 20 hours. The reaction mixture was distilled and the yield was 0.57 mole of 2,4,4,4-tetrachlorobutanol.

I claim:
1. A process of forming a polyhalogenated compound from a mixture consisting essentially of an olefinic compound, a halogenated methane and a catalyst by reacting said olefinic compound having up to 30 carbon atoms and having the general formula:

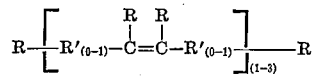

with said halogenated methane having the general formula $CX_3Y$ wherein each R is selected from hydrogen, or alkyl, alkoxy, alkoxycarbonyl, alkanoyl, alkanoyloxy, or cycloalkyl radicals having from 1 to 20 carbon atoms, or hydroxy-, carboxy-, oxo-, or halogen-substituted alkyl or cycloalkyl radicals having from 1 to 20 carbon atoms; each R' is an alkylene radical havin from 1 to 10 carbon atoms or a hydroxy-, oxo-, or halogen-substituted alkylene radical having from 1 to 10 carbon atoms, and in which double bonds, if present, are in nonconjugated positions; X is any halogen; and Y is selected from hydrogen, chlorine, bromine, or iodine; said catalyst being formed by mixing a transition metal carbonyl of the general formula $M(CO)_z$ wherein M is a transition metal of Group VIII, and z is a coordination number of M; and a coordinating compound selected from $R''_3P$, $(R''O)_3P$, wherein each R″ is selected from alkyl, aryl, cycloalkyl radicals, or combinations thereof, each having from 1 to 20 carbon atoms therein, said reaction being carried out at a temperature within the range of 50 to 110° and a pressure sufficient to keep the reactants in substantially liquid phase.

2. The process of claim 1 wherein the ratio between said coordinating compound and said transition metal carbonyl is in the range of 0.1 to 4 molecular weight equivalents of said coordinating compound for each atomic weight equivalent of the transition metal in said transition metal carbonyl compound.

3. The process of claim 2 wherein 0.1 to 5 molecular weight equivalents of said halogenated methane are reacted with each molecular weight equivalent of said olefinic compound.

4. The process of claim 3 wherein from 0.0001 to 1 atomic weight equivalents of the transition metal in said transition metal carbonyl compound are used for each molecular weight equivalent of said olefinic compound.

5. The process of claim 3 wherein allyl alcohol is reacted with carbon tetrachloride to form 2,4,4,4-tetrachlorobutanol.

6. The process of claim 5 wherein said catalyst consists of a mixture of iron pentacarbonyl and tributylphosphine.

7. The process of claim 5 wherein said catalyst consists of iron pentacarbonyl and triphenylphosphite.

References Cited

UNITED STATES PATENTS 3,213,149  10/1965  Takahashi et al.

FOREIGN PATENTS 667,192    7/1963   Canada.
1,207,366  12/1965  Germany.
803,463    10/1958  Great Britain.
920,855    3/1963   Great Britain.

OTHER REFERENCES

Asscher et al., Ind. and Eng. Chem. (Product Research and Dev.), vol. 2, No. 2, June 1963, pp. 121–126.

Asscher et al., Jour. Chem. Soc. (1963), pp. 1887–1896.

LEON ZITVER, Primary Examiner

H. T. MARS, Assistant Examiner

U.S. Cl. X.R.

260—410, 468, 493, 497, 514, 539, 586, 593, 604, 611, 614, 617, 648, 658